(12) United States Patent
Hiramitsu et al.

(10) Patent No.: US 12,076,972 B2
(45) Date of Patent: Sep. 3, 2024

(54) PRODUCTION METHOD FOR BONDED ARTICLE, AND BONDED ARTICLE

(71) Applicant: OMRON Corporation, Kyoto (JP)

(72) Inventors: Norihito Hiramitsu, Kyoto (JP); Takekazu Komori, Kyoto (JP)

(73) Assignee: OMRON Corporation, Kyoto (JP)

( * ) Notice: Subject to any disclaimer, the term of this patent is extended or adjusted under 35 U.S.C. 154(b) by 115 days.

(21) Appl. No.: 17/621,235

(22) PCT Filed: Jul. 1, 2020

(86) PCT No.: PCT/JP2020/025819
§ 371 (c)(1),
(2) Date: Dec. 20, 2021

(87) PCT Pub. No.: WO2021/006145
PCT Pub. Date: Jan. 14, 2021

(65) Prior Publication Data
US 2022/0355573 A1 Nov. 10, 2022

(30) Foreign Application Priority Data
Jul. 5, 2019 (JP) .................................. 2019-126225

(51) Int. Cl.
*B32B 7/12* (2006.01)
*B32B 3/30* (2006.01)
(Continued)

(52) U.S. Cl.
CPC .................. *B32B 7/12* (2013.01); *B32B 3/30* (2013.01); *B32B 37/1207* (2013.01); *C09J 5/06* (2013.01);
(Continued)

(58) Field of Classification Search
CPC ......... B32B 3/30; B32B 7/12; B32B 37/1207; B32B 2307/302; B32B 2551/00; C09J 5/06; C09J 2301/304
See application file for complete search history.

(56) References Cited

U.S. PATENT DOCUMENTS

2018/0029303 A1 2/2018 Wano

FOREIGN PATENT DOCUMENTS

| CN | 1537484 | 10/2004 |
| CN | 101441877 | 5/2009 |
(Continued)

OTHER PUBLICATIONS

Translation of JP2004237556A. (Year: 2004).*
(Continued)

*Primary Examiner* — Catherine A. Simone
(74) *Attorney, Agent, or Firm* — JCIPRNET

(57) ABSTRACT

In order to thermally cure a thermosetting adhesive quickly and with less energy, the bonded article (10) according to the present invention comprises an adherend member (1) having a thermal conductivity of 1 w/m·K or more, an adherend member (2) made of a material which can adhere to the adherend member (1), and an adhesion portion that is formed of a cured product of a thermosetting adhesive (3) and that is in contact with both the adherend member (1) and the adherend member (2), wherein the adherend member (1) has a heat transfer-inhibiting structure (4) which inhibits the transfer of heat from a portion thereof in contact with the adhesive (3) to a peripheral portion thereof.

9 Claims, 6 Drawing Sheets

(51) Int. Cl.
   *B32B 37/12* (2006.01)
   *C09J 5/06* (2006.01)

(52) U.S. Cl.
   CPC ..... *B32B 2307/302* (2013.01); *B32B 2551/00* (2013.01); *C09J 2301/304* (2020.08)

(56) References Cited

FOREIGN PATENT DOCUMENTS

| | | |
|---|---|---|
| CN | 102620134 | 8/2012 |
| DE | 102008054628 | 6/2010 |
| JP | 861147238 | 9/1986 |
| JP | 108132529 | 5/1996 |
| JP | 2002069390 | 3/2002 |
| JP | 2004237556 A * | 8/2004 |
| JP | 2005298638 | 10/2005 |
| JP | 2009116966 | 5/2009 |
| JP | 2015174911 | 10/2015 |
| JP | 2018016056 | 2/2018 |
| JP | 2018134955 | 8/2018 |
| KR | 20110040928 | 4/2011 |

OTHER PUBLICATIONS

"Office Action of China Counterpart Application" with English translation thereof, issued on Oct. 28, 2022, p. 1-p. 15.

"International Search Report (Form PCT/ISA/210) of PCT/JP2020/025819," mailed on Sep. 1, 2020, with English translation thereof, pp. 1-4.

"Written Opinion of the International Searching Authority (Form PCT/ISA/237) of PCT/JP2020/025819," mailed on Sep. 1, 2020, with English translation thereof, pp. 1-8.

"Office Action of Korea Counterpart Application", issued on Mar. 20, 2023, with English translation thereof, pp. 1-12.

Office Action of Japan Counterpart Application, with English translation thereof, issued on Jan. 10, 2023, pp. 1-7.

* cited by examiner

PRODUCTION METHOD FOR BONDED ARTICLE, AND BONDED ARTICLE

CROSS-REFERENCE TO RELATED APPLICATION

This application is a 371 application of the International PCT application serial no. PCT/JP2020/025819, filed on Jul. 1, 2020, which claims the priority benefits of Japan Patent Application No. 2019-126225, filed on Jul. 5, 2019. The entirety of each of the above-mentioned patent applications is hereby incorporated by reference herein and made a part of this specification.

TECHNICAL FIELD

The present invention relates to a production method for a bonded article in which a first member is bonded to a second member, and a bonded article.

RELATED ART

Conventionally, when a first member and a second member are bonded to each other with a thermosetting adhesive, if at least one of the first member and the second member is a member having a high thermal conductivity and a high thermal capacity, the thermosetting adhesive is generally cured by heating the entire first member and second member by a heat treatment furnace.

For example, Patent Literature 1 discloses a technique in which a workpiece which is assembled using a thermosetting adhesive is heated by using a continuous heating furnace of superheated steam, and thereby the thermosetting adhesive is cured. In the technique described in Patent Literature 1, because the heat accumulated in the superheated steam is transmitted to the workpiece not only by convection but also by radiation, the time required for the thermal curing treatment of the adhesive becomes short.

In addition, for example, in the technique described in Patent Literature 2, in a case of bonding an optical prism to a housing, an acrylic-based ultraviolet curable resin is used at an interface between the optical prism and the housing.

CITATION LIST

Patent Literature

Patent Literature 1: Japanese Patent Laid-Open No. 2002-69390
Patent Literature 2: Japanese Patent Laid-Open No. 2005-298638

SUMMARY OF INVENTION

Technical Problem

However, in the technique described in Patent Literature 1, it is difficult to locally heat a peripheral region of a portion of the workpiece to which the thermosetting adhesive is applied. Therefore, there is a problem that the degree of freedom in a material selection of the workpiece is lowered due to the heat resistance. In addition, the dimensional of the workpiece is changed due to the difference in thermal expansion and contraction, which causes a misalignment or the like during workpiece assembly and deterioration of the quality of the workpiece or the product. Furthermore, there are problems such as a decrease in productivity due to a long thermal curing time of the adhesive, and a decrease in production space or production energy efficiency due to the use of the continuous heating furnace.

One aspect of the present invention is made in view of the above-described conventional problems, and an object thereof is to realize a production method for a bonded article that can thermally cure a thermosetting adhesive quickly and with less energy, and a bonded article.

Solution to Problem

In order to solve the above problems, a bonded article according to one aspect of the present invention is characterized in that the bonded article includes: a first member having a thermal conductivity of 1 w/m·K or more, a second member made of a material able to adhere to the first member, and an adhesion portion that is formed of a cured product of a thermosetting adhesive and that is in contact with both the first member and the second member; and the first member has a heat transfer-inhibiting structure that inhibits transfer of heat from a portion in contact with the adhesion portion to a peripheral portion.

In order to solve the above problems, the bonded article according to one aspect of the present invention is characterized in that the bonded article includes: a first member having a thermal conductivity of 1 w/m·K or more, a second member made of a material able to adhere to the first member, and an adhesion portion that is formed of a cured product of a thermosetting adhesive and that is in contact with both the first member and the second member; and in the first member, an amount of transfer of heat of a material constituting a portion in contact with the adhesion portion is smaller than that of a material constituting a portion other than the portion in contact.

In order to solve the above problems, a production method for a bonded article according to one aspect of the present invention is a production method for a bonded article of a first member having a thermal conductivity of 1 w/m·K or more and a second member made of a material able to adhere to the first member. The production method for a bonded article is characterized in that the production method includes: an applying step of applying a thermosetting adhesive so as to contact both the first member and the second member, and a heat-inputting step of introducing heat from a surface of the first member different from an application surface of the adhesive toward an application region of the adhesive; and the first member has a heat transfer-inhibiting structure that inhibits transfer of heat from a heat-inputting portion into which heat is introduced to a peripheral portion.

In order to solve the above problems, a production method for a bonded article according to one aspect of the present invention is a production method for a bonded article of a first member having a thermal conductivity of 1 w/m·K or more and a second member made of a material able to adhere to the first member. The production method for a bonded article is characterized in that the production method includes: an applying step of applying a thermosetting adhesive so as to contact both the first member and the second member, and a heat-inputting step of introducing heat from a surface of the first member different from an application surface of the adhesive toward an application region of the adhesive; and in the first member, an amount of transfer of heat of a material constituting a heat-inputting portion into which heat is introduced is smaller than that of a material constituting a portion other than the heat-inputting portion.

Effects of Invention

According to one aspect of the present invention, the thermosetting adhesive can be thermally cured quickly and with less energy.

Figure 2:
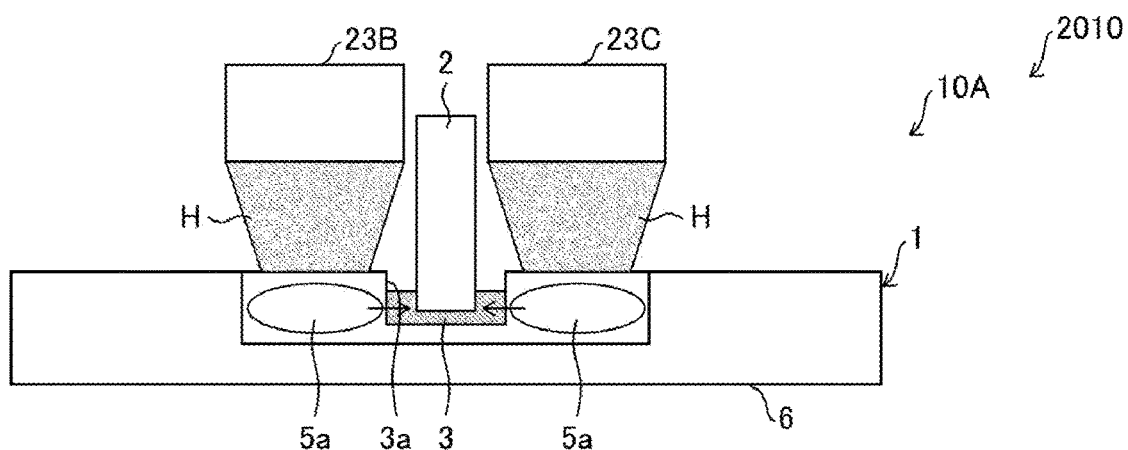
Figure 2:
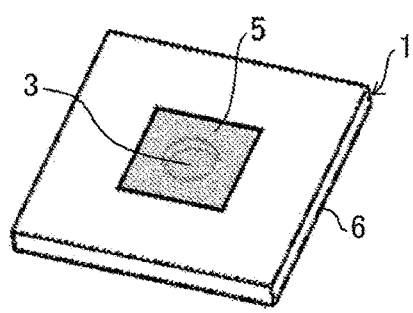

2010 of FIG. 2 is a cross-sectional view showing a production method for a bonded article in another aspect of the present invention, and 2020 of FIG. 2 is a perspective view showing a configuration of an adherend member used in the production method for a bonded article in another aspect of the present invention.

Figure 3:
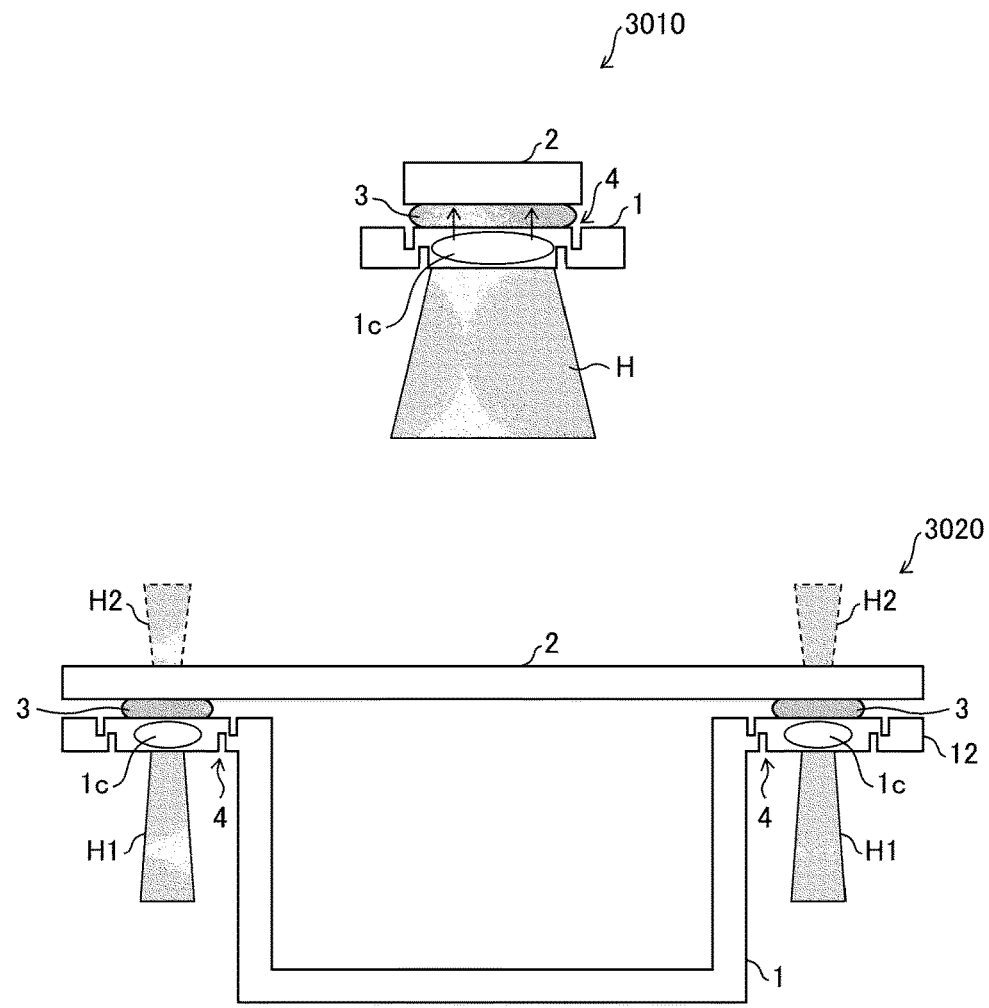

FIG. 3 is a cross-sectional view showing a schematic configuration of a bonded article having a superposed configuration.

Figure 4:
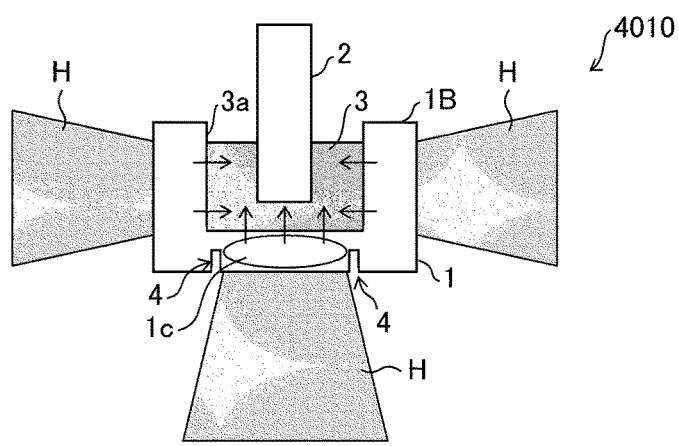

FIG. 4 is a cross-sectional view showing a schematic configuration of a bonded article having an insertion configuration.

Figure 5:
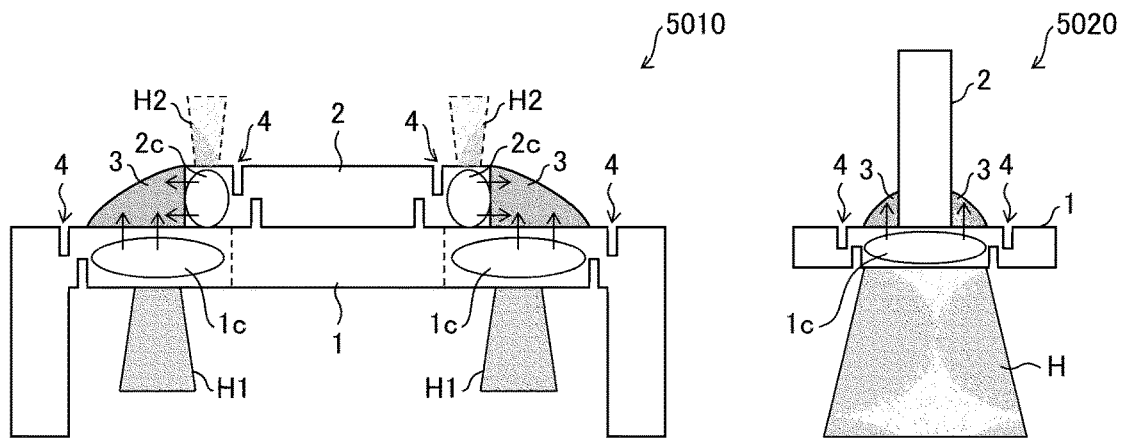

FIG. 5 is a cross-sectional view showing a schematic configuration of a bonded article having a fillet configuration.

Figure 6:
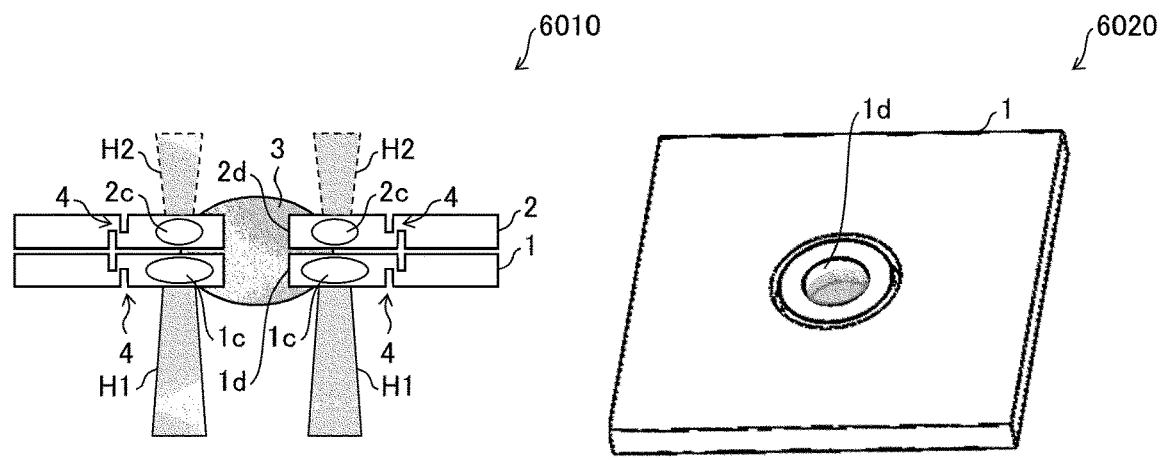

6010 of FIG. 6 is a cross-sectional view showing a schematic configuration of a bonded article having a through configuration, and 6020 of FIG. 6 is a perspective view showing a schematic configuration of the adherend member shown in 6010 of FIG. 6.

Figure 7:
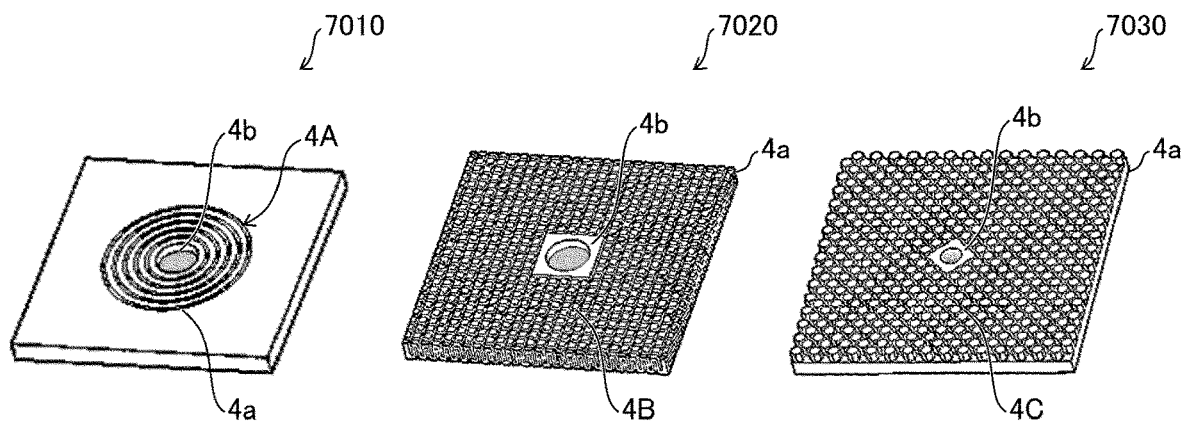

FIG. 7 is a perspective view showing a schematic configuration of a heat transfer-inhibiting structure having a groove processing configuration.

Figure 8:
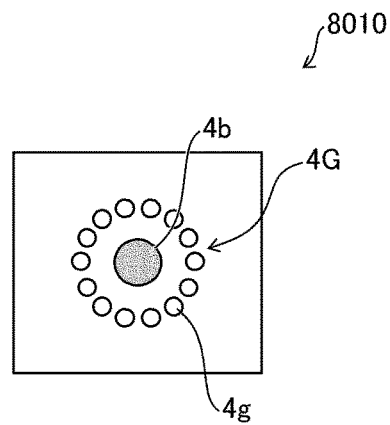

FIG. 8 is a plan view showing a schematic configuration of a heat transfer-inhibiting structure having a hole processing configuration.

Figure 9:
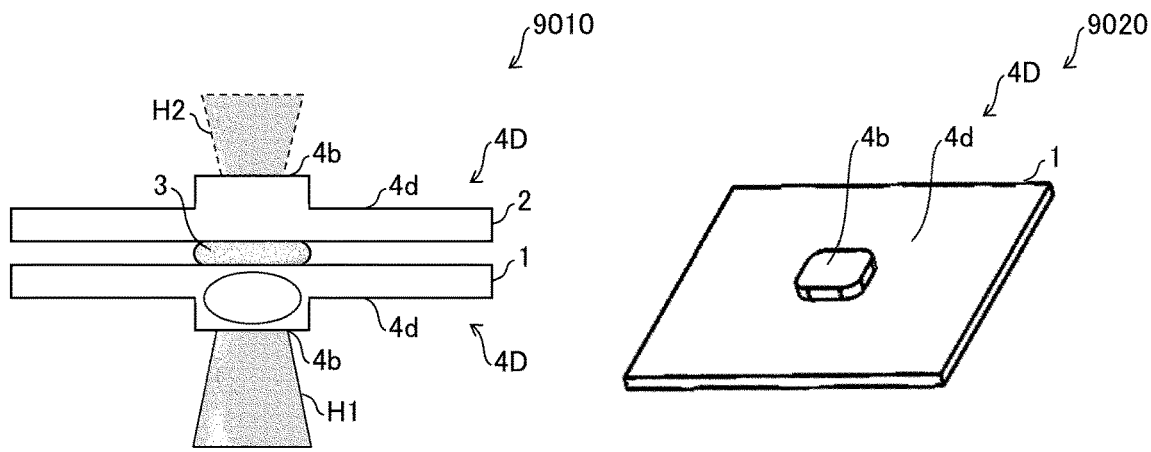

9010 of FIG. 9 is a cross-sectional view showing a schematic configuration of a heat transfer-inhibiting structure having a thin-wall processing structure, and 9020 of FIG. 9 is a perspective view showing a schematic configuration of the adherend member shown in 9010 of FIG. 9.

Figure 10:
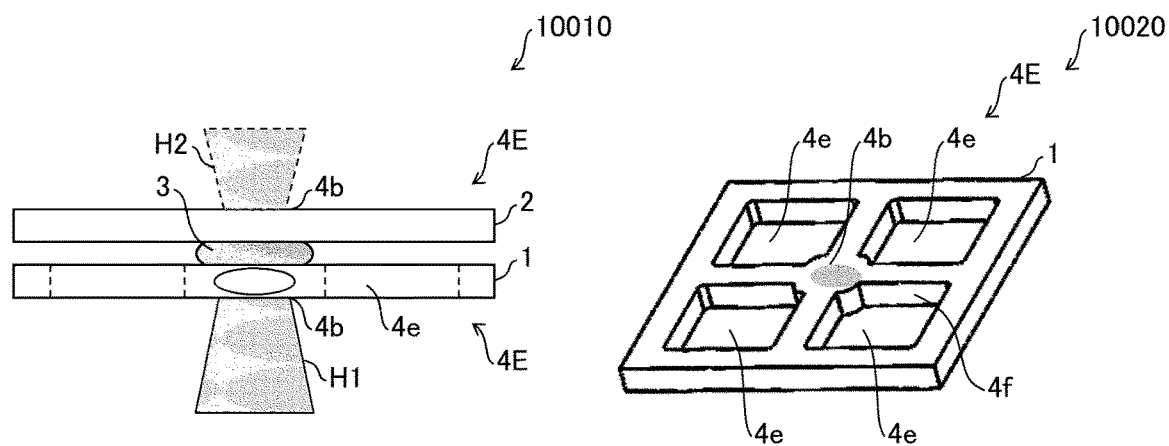

10010 of FIG. 10 is a cross-sectional view showing a schematic configuration of a heat transfer-inhibiting structure having a hollow processing configuration, and 10020 of FIG. 10 is a perspective view showing a schematic configuration of the adherend member shown in 10010 of FIG. 10.

Figure 11:
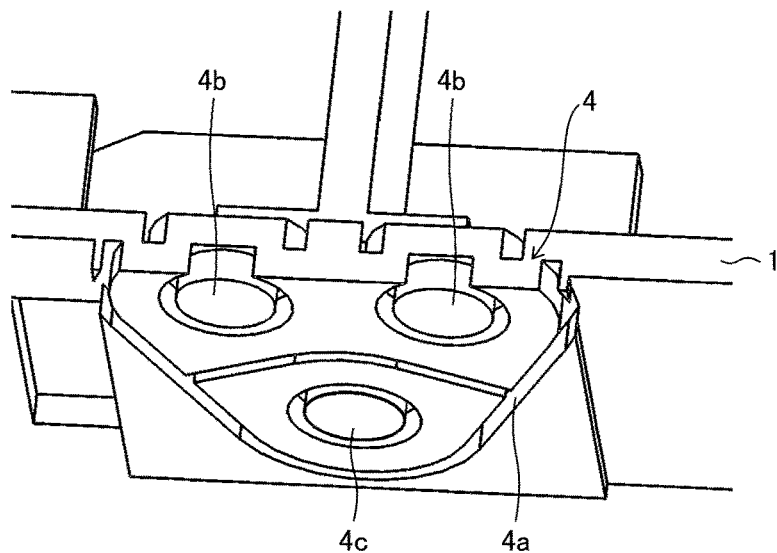

FIG. 11 is a perspective view showing an example of a heat-inputting portion in the adherend member.

Figure 12:
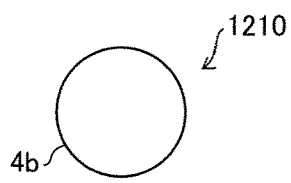
Figure 12:
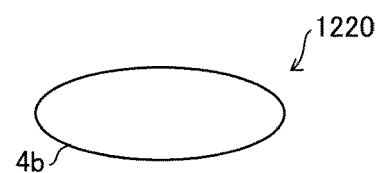
Figure 12:
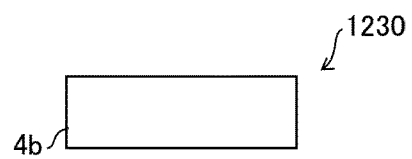
Figure 12:
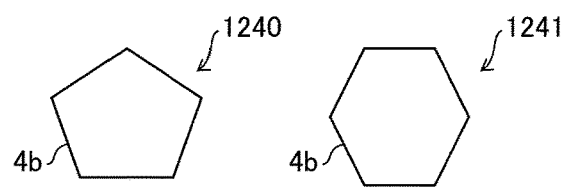

FIG. 12 is a plan view showing a shape of the heat-inputting portion when heat is input by light-condensing heating with a laser or an electron beam.

Figure 13:
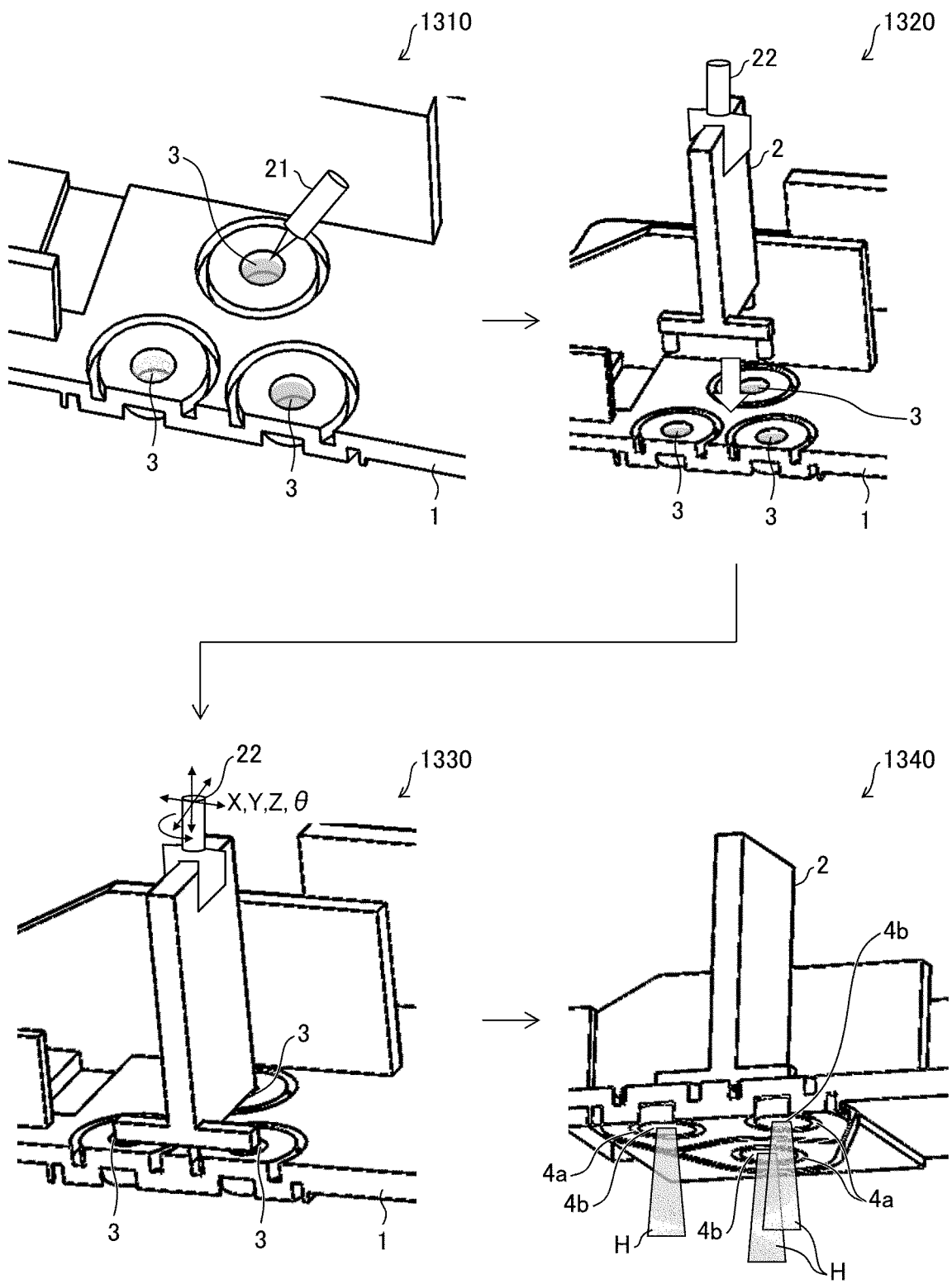

FIG. 13 is a perspective view showing a procedure of a production method for a bonded article according to Embodiment 2.

DESCRIPTION OF EMBODIMENTS

Hereinafter, an embodiment according to one aspect of the present invention (hereinafter, also referred to as "the embodiment") is described with reference to the drawings.

Application Example

Figure 1:
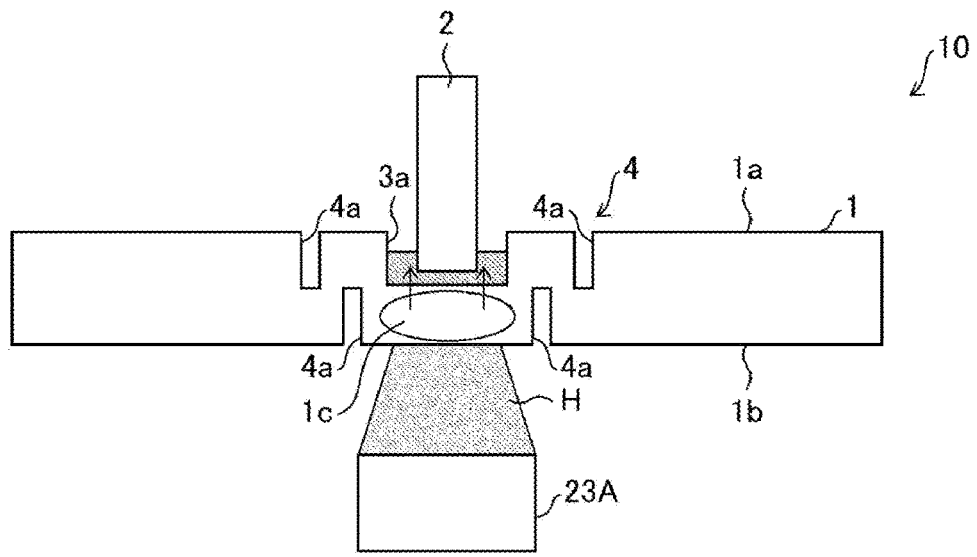
FIG. 1 is a cross-sectional view showing a production method for a bonded article in one aspect of the present invention.

FIG. 1 is a cross-sectional view showing a production method for a bonded article in one aspect of the present invention.

As shown in FIG. 1, a production method for a bonded article 10 in one aspect of the present invention is a production method for the bonded article 10 of an adherend member 1 (a first member) having a thermal conductivity of 1 w/m·K or more and an adherend member 2 (a second member) made of a material that can adhere to the adherend member 1. The production method for the bonded article 10 includes an applying step of applying a thermosetting adhesive 3 so as to be in contact with both the adherend members 1 and 2, and a heat-inputting step of introducing heat H from a surface of the adherend member 1 different from a concave portion 3a being an application portion of the adhesive 3 toward an application region of the adhesive 3. Moreover, in the production method shown in FIG. 1, in the applying step, the adhesive 3 is injected into the concave portion 3a arranged in the adherend member 1. Then, by arranging the adherend member 2 in the concave portion 3a into which the adhesive 3 has been injected, the adhesive 3 comes into contact with both the adherend members 1 and 2. In addition, in the heat-inputting step, the heat is introduced from a back surface 1a of the adherend member 1 on the side opposite to the application surface of the adhesive 3 toward the application region of the adhesive 3 by using a heat-inputting device 23A. A heat-inputting portion 1c in the adherend member 1 into which the heat H is introduced is arranged directly below the adhesive 3.

In addition, in the above method, the adherend member 1 has a heat transfer-inhibiting structure 4 that inhibits transfer of heat from the heat-inputting portion 1c into which the heat H is introduced to a peripheral portion of the adherend member 1. In the configuration shown in FIG. 1, the heat transfer-inhibiting structure 4 has concave grooves 4a. The concave grooves 4a are arranged between the heat-inputting portion 1c and the peripheral portion in the adherend member 1.

According to the above method, because the heat H is introduced into the heat-inputting portion 1c of the adherend member 1 in the heat-inputting step, the introduced heat H is conducted from the heat-inputting portion 1c toward the peripheral portion. Here, the concave groove 4a is formed between the heat-inputting portion 1c and the peripheral portion in the adherend member 1. In other words, the adherend member 1 has a configuration in which the heat-inputting portion 1c and the portion other than the heat-inputting portion 1c are partitioned by the concave groove 4a. Therefore, the heat H introduced into the heat-inputting portion 1c is conducted to the space (air) configured by the concave groove 4a before being transmitted to the peripheral portion. Generally, the conductivity of the heat H in air is much lower than that inside the adherend member 1 (the thermal conductivity is 1 w/m·K or more). Therefore, a heat flux that is conducted from the heat-inputting portion 1c and reaches the peripheral portion decreases due to the concave groove 4a. That is, the conduction of the heat H to the peripheral portion of the adherend member 1 is inhibited. As a result, the heat H is less likely to be conducted from the concave groove 4a to the peripheral portion, and is more likely to be remained in the portion on the heat-inputting portion 1c side than in the concave groove 4a. Therefore, because the amount of the heat remained in the heat-inputting portion 1c is increased, local heating at the heat-inputting portion 1c can be realized. On the other hand, when the heat transfer-inhibiting structure 4 as shown in FIG. 1 is not arranged, the heat H introduced into the heat-inputting portion 1c is quickly conducted inside the adherend member 1 and reaches the peripheral portion. Therefore, local heating at the heat-inputting portion 1c cannot be realized.

The adhesive 3 is thermally cured by this local heating of the heat-inputting portion 1c in the heat-inputting step. Then, the adherend member 1 is bonded to the adherend member 2.

In this way, according to the above method, the heat H can be directly input to the heat-inputting portion 1c and local heating can be performed in order to cure the adhesive 3 applied to the adherend member 1 having a thermal conductivity of 1 w/m·K or more. Therefore, the thermosetting adhesive 3 can be thermally cured quickly and with less energy.

The bonded article 10 in one aspect of the present invention produced by the above method includes the adherend member 1 having a thermal conductivity of 1 w/m·K or more, the adherend member 2 made of a material that can adhere to the adherend member 1, and an adhesion portion that is formed of a cured product of the thermosetting adhesive 3 and that is in contact with both the adherend members 1 and 2. Besides, the adherend member 1 has a heat transfer-inhibiting structure 4 that inhibits transfer of heat from a portion thereof in contact with the adhesion portion to a peripheral portion thereof. In the configuration shown in FIG. 1, the heat transfer-inhibiting structure 4 includes the concave groove 4a arranged between the portion in contact with the adhesion portion and the peripheral portion in the adherend member 1.

Here, in the bonded article 10, the cured product of the adhesive 3 being a constituent component of the adhesion portion is in contact with the heat-inputting portion 1c of the adherend member 1. In the production method for the bonded article 10, the heat is introduced into the heat-inputting portion 1c of the adherend member 1 that is in contact with the adhesive 3, and the adhesive 3 is thermally cured. Therefore, the portion of the adherend member 1 that is in contact with the adhesion portion corresponds to the heat-inputting portion 1c into which the heat H is introduced.

2010 of FIG. 2 is a cross-sectional view showing a production method for a bonded article 10A in another aspect of the present invention, and 2020 of FIG. 2 is a perspective view showing a configuration of the adherend member 1 used in the production method for the bonded article 10A in another aspect of the present invention. As shown in 2020 of FIG. 2, in the production method for the bonded article 10A in another aspect of the present invention, the configuration of the adherend member 1 is different from the configuration shown in FIG. 1.

The adherend member 1 has a configuration in which a nesting member 5 is mounted on a mounting member 6. The nesting member 5 and the mounting member 6 are separate members. The nesting member 5 is provided with the concave portion 3a into which the adhesive 3 is injected, and has two heat-inputting portions 5a with the concave portion 3a interposed therebetween. In the heat-inputting step, by using heat-inputting devices 23B and 23C, the heat H is input to the two heat-inputting portions 5a from a side of the nesting member 5 to which the adhesive 3 has been applied. In the adherend member 1, the nesting member 5 configures the heat-inputting portion 5a into which the heat H is introduced. In addition, the mounting member 6 configures a portion other than the heat-inputting portion 5a.

Here, in the method shown in FIG. 2, in the adherend member 1, the thermal conductivity of the material constituting the nesting member 5 is smaller than that of the portion constituting the mounting member 6. Thus, in the heat-inputting step, the heat is likely to be remained in the nesting member 5, and local heating can be realized. Therefore, according to the method shown in FIG. 2, the thermosetting adhesive 3 can be thermally cured quickly and with less energy.

Moreover, in the method shown in FIG. 2, two heat-inputting devices 23B and 23C are used for the two heat-inputting portions 5a in the heat-inputting step. However, the number of the heat-inputting devices can be appropriately set according to the heat-inputting method and the like. For example, when a heat-inputting device that employs a heat-inputting method using a laser or an electron beam is used, generally, one heat-inputting device is sufficient. Besides, the heat-inputting method may be, for example, a method of inputting heat by simultaneously irradiating a beam to a plurality of heat-inputting portions according to the shape of the beam irradiation region set by a beam shape adjustment combined with a mask, or a method of inputting heat by scanning one heat-inputting device and irradiating a beam to a plurality of heat-inputting portions.

Moreover, the materials of the nesting member 5 and the mounting member 6 are not particularly limited as long as the thermal conductivities are 1 w/m·K or more and the thermal conductivity of the nesting member 5 is smaller than that of the mounting member 6. For example, when the material constituting the mounting member 6 is aluminum (thermal conductivity: 237 w/m·K), the material constituting the nesting member 5 may be stainless steel (SUS) (thermal conductivity: 16 w/m·K), ceramics, resins having a thermal conductivity of 1 w/m·K or more, or the like.

According to the methods shown in FIG. 1 and FIG. 2, by local heating of the adherend member 1 having a thermal conductivity of 1 w/m·K or more, the influence of heat on the peripheral members is reduced. Therefore, a member having a low heat resistant temperature can be used as a constituent member of the bonded article 10 or 10A. Consequently, the degree of freedom in designing the members is increased, and the degree of freedom in designing the bonded article 10 or 10A is improved.

In addition, because the dimensional change or misalignment due to thermal expansion and contraction of the cured product of the adhesive 3 at the bonding portion between the adherend members 1 and 2 is small, the quality stability of the bonded article is improved. Therefore, the cost for inspection and management caused by the production variation of the bonded article can be reduced, and the production cost can be reduced.

In addition, because the thermosetting adhesive 3 is used, the film thickness of the cured product of the adhesive 3 is made uniform. Therefore, the thick film application and curing of the adhesive 3 can be performed. Therefore, the 3D-shaped adherend members 1 and 2 can be bonded and fixed to each other. Moreover, when a UV curable adhesive is used, film thickness unevenness occurs in the cured product, resulting in curing unevenness or uncured portion. Therefore, the UV curable adhesive is not used for bonding the 3D-shaped adherend members 1 and 2 to each other, but is used for bonding 2D-shaped adherend members such as sheets or the like to each other.

In addition, according to the methods shown in FIG. 1 and FIG. 2, in the heat-inputting step, the heat H is not directly input to the adhesive 3, but is input to the adhesive 3 via the adherend member 1 or the nesting member 5. Therefore, there are no restrictions on the components and properties of the adhesive 3 (the color and the compounding agent of the adhesive 3).

The production method for the bonded article 10 or 10A according to the aspect of the present invention can be applied to technologies that require bonding of optical lens components such as optical sensors, optical sensors for FA, robot vision, or the like. In addition, the production method for the bonded article 10 or 10A according to the aspect of the present invention can also be applied to technologies that require hermetic sealing of a metal housing of a relay, a switch, or the like by an adhesive.

Configuration Example

Embodiment 1

(Configuration of Bonded Article)

A configuration of the bonded article according to the embodiment is described. FIG. 3 is a cross-sectional view showing a schematic configuration of a bonded article having a superposed configuration. FIG. 4 is a cross-sectional view showing a schematic configuration of a bonded article having an insertion configuration. FIG. 5 is a cross-sectional view showing a schematic configuration of a bonded article having a fillet configuration. 6010 of FIG. 6 is a cross-sectional view showing a schematic configuration of a bonded article having a through configuration, and 6020 of FIG. 6 is a perspective view showing a schematic configuration of the adherend member 1 shown in 6010 of FIG. 6.

A superposed configuration 3010 shown in FIG. 3 is a configuration in which the adherend members 1 and 2 have a flat plate shape and are bonded to each other via the adhesive 3. In the superposed configuration 3010, the adhesive 3 is arranged on the surfaces of the adherend members 1 and 2 which face each other.

In addition, in the superposed configuration 3020 shown in FIG. 3, the adherend member 1 has a container shape having an opening at an upper edge, and the adherend member 2 has a lid shape that closes the container-shaped adherend member 1. Flange portions 12 protruded to the side portions are formed on the upper edge of the adherend member 1. The adherend member 2 is bonded to the flange portions 12 via the adhesive 3. In the superposed structure 3020, the heat transfer-inhibiting structure 4 is formed in the flange portion 12. Therefore, in the heat-inputting step, when the heat is input from a surface of the flange portion 12 on the side opposite to the adhesive 3, local heating at the heat-inputting portion 1c being the peripheral portion of the adhesive 3 can be performed.

Moreover, when a UV curable adhesive is used in the superposed configurations 3010 and 3020, the UV light does not reach the deep portion of the adhesive and an uncured product is generated, resulting in curing unevenness. According to the embodiment, even for the superposed configurations 3010 and 3020 in which curing unevenness occurs when a UV curable adhesive is used, because local heating can be performed using the thermosetting adhesive 3, heating can be performed from directly below the adhesive 3 and uniform curing can be realized.

An insertion configuration 4010 shown in FIG. 4 is a configuration in which the adherend member 2 is erected at the adherend member 1. The concave portion 3a accommodating the adhesive 3 is formed in the adherend member 1, and the adherend member 2 is inserted into the concave portion 3a. In addition, the heat transfer-inhibiting structure 4 is formed in a lower portion of the concave portion 3a. Therefore, in the heat-inputting step, when the heat is input from a surface of the adherend member 1 on the side opposite to the adhesive 3, local heating at the heat-inputting portion 1c being the lower portion of the concave portion 3a can be performed. In addition, in the insertion configuration 4010, the heat-inputting may also be performed on the side portion of the concave portion 3a.

Moreover, when a UV curable adhesive is used in the insertion configuration 4010, the UV light does not reach directly below the adhesive and an uncured product is generated, resulting in curing unevenness. According to the embodiment, even for the insertion configuration 4010 in which curing unevenness occurs when a UV curable adhesive is used, because local heating can be performed using the thermosetting adhesive 3, heating can be performed from directly below the adhesive 3 and uniform curing can be realized.

A fillet configuration 5010 shown in FIG. 5 is a configuration in which the flat plate-shaped adherend members 1 and 2 have a flat plate shape, and the adhesive 3 is arranged at a corner portion of the adherend member 2. The adhesive 3 is arranged so as to be in contact with both an upper surface of the adherend member 1 and a side surface of the adherend member 2. That is, the cured product of the adhesive 3 is formed as a fillet formed at the corner of the adherend member 2. In the fillet configuration 5010, the heat transfer-inhibiting structure 4 is formed in the vicinity of the portion of the adherend member 1 that is in contact with the adhesive 3 and in the corner portion of the adherend member 2. Therefore, in the heat-inputting step, when heat H1 is input from the surface of the adherend member 1 on the side opposite to the adhesive 3, local heating at the heat-inputting portion 1c being the lower portion of the adhesive 3 can be performed. In addition, when heat H2 is input from an upper surface of the corner portion of the adherend member 2, local heating at a heat-inputting portion 2c being a corner portion of the adherend member 2 can be performed. In this way, in the fillet structure 5010, the heat can also be input from the adherend member 2 in addition to the adherend member 1. Moreover, in the fillet configuration 5010, the amount of the heat H1 input from the adherend member 1 and the amount of the heat H2 input from the adherend member 2 are not particularly limited, and can be appropriately set according to the shape of the bonding portion of the adherend members 1 and 2, the heat resistance of the peripheral members of the adherend members 1 and 2, and the like.

In addition, in the fillet structure 5020, the adherend member 2 is erected at the adherend member 1, and the adhesive 3 is arranged at a corner portion formed by the adherend members 1 and 2. The heat transfer-inhibiting structure 4 is formed in the vicinity of an erection portion of the adherend member 2 in the adherend member 1. Therefore, in the heat-inputting step, when the heat H is input from the surface of the adherend member 1 on the side opposite to the adhesive 3, local heating at the heat-inputting portion 1c being the erection portion of the adherend member 2 in the adherend member 1 can be performed.

As shown in 6010 and 6020 of FIG. 6, the through configuration is a configuration in which through holes 1d and 2d are respectively formed in the adherend members 1 and 2. The adherend members 1 and 2 are bonded in a manner that the through holes 1d and 2d communicate with each other. Besides, the adhesive 3 is arranged at least inside the through holes 1d and 2d. In addition, the heat transfer-inhibiting structure 4 is formed in the vicinity of the through hole 1*d* in the adherend member 1 and in the vicinity of the through hole 2*d* in the adherend member 2. Therefore, in the heat-inputting step, when the heat H1 is input from a surface of the adherend member 1 on the side opposite to the adherend member 2, local heating at the heat-inputting portion 1*c* being the vicinity portion of the through hole 1*d* can be performed. In addition, when the heat H2 is input from a surface of the adherend member 2 on the side opposite to the adherend member 1, local heating at the heat-inputting portion 2*c* being the vicinity portion of the through hole 2*d* can be performed.

(Heat Transfer-Inhibiting Structure)

The heat transfer-inhibiting structure 4 in the embodiment is not particularly limited as long as it is a structure in which a heat flux that is conducted from the heat-inputting portion 1*c* of the adherend member 1 and reaches the peripheral portion becomes small. In particular, the heat transfer-inhibiting structure 4 preferably has a configuration in which the heat-inputting portion 1*c* (the portion of the adherend member 1 that is in contact with the adhesive) and a portion other than the heat-inputting portion 1*c* in the adherend member 1 are partitioned by a space.

FIG. 7 is a perspective view showing a schematic configuration of a heat transfer-inhibiting structure having a groove processing configuration. As shown in FIG. 7, heat transfer-inhibiting structures 4A to 4C include the concave groove 4*a* arranged between a heat-inputting portion 4*b* in the adherend member 1 and the peripheral portion of the adherend member 1. In other words, in the heat transfer-inhibiting structures 4A to 4C shown in FIG. 7, the heat-inputting portion 4*b* and the peripheral portion in the adherend member 1 are partitioned by a space formed by the concave grooves 4*a*.

The heat transfer-inhibiting structure 4A of a groove processing configuration 7010 shown in FIG. 7 has a configuration in which the plurality of circular concave grooves 4*a* are formed in a manner of surrounding the heat-inputting portion 4*b*. In addition, the heat transfer-inhibiting structure 4B of a groove processing configuration 7020 has a configuration in which grid-like concave grooves 4*a* are formed in a manner of surrounding the heat-inputting portion 4*b*. In addition, in the heat transfer-inhibiting structure 4C of a groove processing configuration 7030, the concave grooves 4*a* are formed in a manner of surrounding the heat-inputting portion 4*b*, and are arranged in a manner of configuring a plurality of polygons.

FIG. 8 is a plan view showing a schematic configuration of a heat transfer-inhibiting structure having a hole processing configuration. As shown in FIG. 8, a heat transfer-inhibiting structure 4G includes a plurality of holes 4*g* arranged between the heat-inputting portion 4*b* in the adherend member 1 and the peripheral portion of the adherend member 1. In other words, in the heat transfer-inhibiting structure 4G shown in FIG. 8, the heat-inputting portion 4*b* and the peripheral portion in the adherend member 1 are partitioned by a space formed by the plurality of holes 4*g*.

In the heat transfer-inhibiting structure 4G of the hole processing configuration 8010, each of the plurality of holes 4*g* is a round hole. Besides, the plurality of holes 4*g* are configured to be formed into a circular shape and in a manner of surrounding the heat-inputting portion 4*b*. The hole 4*g* is a non-through hole that does not penetrate the adherend member 1, and is formed by drilling processing. Moreover, in the heat transfer-inhibiting structure 4G, the hole 4*g* is a round hole. However, the hole 4*g* is not limited to a round hole, and any hole can be adopted as long as it is a non-through hole.

9010 of FIG. 9 is a cross-sectional view showing a schematic configuration of a heat transfer-inhibiting structure 4D having a thin-wall processing configuration, and 9020 of FIG. 9 is a perspective view showing a schematic configuration of the adherend member 1 shown in 9010 of FIG. 9. As shown in 9010 and 9020 of FIG. 9, the heat transfer-inhibiting structure 4D includes a thin-wall portion 4*d*. The thin-wall portion 4*d* is arranged closer to the peripheral portion side than the heat-inputting portion 4*b* of the adherend member 1 in contact with the adhesive, and the thickness of the thin-wall portion 4*d* is smaller than that of the heat-inputting portion 4*b*. A level difference is formed between the heat-inputting portion 4*b* and the thin-wall portion 4*d*. Besides, the heat-inputting portion 4*b* and the peripheral portion in the adherend member 1 are partitioned by the space formed by this level difference. Even with this configuration, in the heat-inputting step, when the heat H1 is input from a surface of the adherend member 1 on the side opposite to the adhesive 3 to the heat-inputting portion 4*b*, local heating at the heat-inputting portion 4*b* can be performed. In addition, the thin-wall portion in the heat transfer-inhibiting structure 4D is also arranged in the adherend member 2. Therefore, when the heat H2 is input to the heat-inputting portion 4*b* from a surface of the adherend member 2 on the side opposite to the adhesive 3, local heating can also be performed at the heat-inputting portion 4*b*.

10010 of FIG. 10 is a cross-sectional view showing a schematic configuration of a heat transfer-inhibiting structure 4E having a hollow processing configuration, and 10020 of FIG. 10 is a perspective view showing a schematic configuration of the adherend member 1 shown in 10010 of FIG. 10. As shown in 10010 and 10020 of FIG. 10, the heat transfer-inhibiting structure 4E includes a narrow width portion 4*f*. The narrow width portion 4*f* is narrower than or has the same width as the heat-inputting portion 4*b* of the adherend member 1 in contact with the adhesive. As shown in 10020 of FIG. 10, in the adherend member 1, hollow portions 4*e* that vertically penetrate the adherend member 1 are formed by the narrow width portion 4*f*. Besides, the heat-inputting portion 4*b* and the peripheral portion in the adherend member 1 are partitioned by the hollow portion 4*e*. Even with this configuration, in the heat-inputting step, when the heat H1 is input from a surface of the adherend member 1 on the side opposite to the adhesive 3 to the heat-inputting portion 4*b*, local heating at the heat-inputting portion 4*b* can be performed. In addition, for the heat transfer-inhibiting structure 4E, the heat H2 may also be input from a surface of the adherend member 2 on the side opposite to the adhesive 3 to the heat-inputting portion 4*b*. Moreover, in the configuration shown in FIG. 10, the amount of the heat H1 input from the adherend member 1 and the amount of the heat H2 input from the adherend member 2 are not particularly limited, and can be appropriately set according to the shape of the bonding portion of the adherend members 1 and 2, the heat resistance of the peripheral members of the adherend members 1 and 2, and the like.

(Adherend Member 1)

The adherend member 1 is not particularly limited as long as it is made of a material having a thermal conductivity of 1 w/m·K or more. The material of the adherend member 1 may be, for example, a metal having a thermal conductivity of 10 w/m·K or more such as aluminum, aluminum alloy, copper, copper alloy, and iron, a high thermal conductivity resin having a thermal conductivity of 1 to 10 w/m·K, or the like.

The high thermal conductivity resin may be, for example, polycarbonate resin (PC resin), polybutylene terephthalate resin (PBT resin), polyamide resin (PA resin), or the like. Specific examples of the polycarbonate resin include TPN2352, TPN2140, TPN2354, TPN2131, TPN1122, TCP1140, and the like manufactured by Mitsubishi Engineering-Plastics Corporation. In addition, specific examples of the polybutylene terephthalate resin include TGN510, TGN515U, and the like manufactured by Mitsubishi Engineering-Plastics Corporation. In addition, specific examples of the polyamide resin include XMT2001, 2547T, 4001TS, C5091TS, and the like manufactured by Mitsubishi Engineering-Plastics Corporation.

In addition, the surface of the adherend member 1 is preferably blackened. Thereby, the surface absorption rate of the heat H is improved in the heat-inputting step. Therefore, local heating and curing of the adherend member 1 is increased, and the adhesive 3 can be cured quickly.

(Adherend Member 2)

The adherend member 2 is not particularly limited as long as it is a member made of a material that can adhere to the adherend member 1. The material of the adherend member 2 may be, for example, metal, resin, glass, ceramic, or the like.

In particular, the adherend member 2 is preferably a resin lens. In this case, the material of the adherend member 2 is not particularly limited as long as it has thermoplasticity and a predetermined transmittance to the laser beam. Basically, the resin materials exemplified below can be used. In addition, a coloring material may also be mixed as long as a predetermined transmittance can be secured.

Specifically, as the material of the adherend member 2, for example, PVC (polyvinyl chloride), PS (polystyrene), AS (acrylonitrile styrene), ABS (acrylonitrile butadiene styrene), PMMA (polymethyl methacrylate), PE (polyethylene), PP (polypropylene), PC (polycarbonate), m-PPE (modified polyphenylene ether), PA6 (polyamide 6), PA66 (polyamide 66), POM (polyacetal), PET (polyethylene terephthalate), PBT (polybutylene terephthalate), PSF (polysulfone), PAR (polyallylate), PEI (polyetherimide), PPS (polyphenylene sulfide), PES (polyethersulfon), PEEK (polyetheretherketone), PAI (polyamideimide), LCP (liquid crystal polymer), PVDC (polyvinylidene chloride), PTFE (polytetrafluoroethylene), PCTFE (polychlorotrifluoroethylene), and PVDF (polyvinylidene difluoride) can be used. In addition, TPE (thermoplastic elastomer) may also be used. Examples of TPE include TPO (olefin-based), TPS (styrene-based), TPEE (ester-based), TPU (urethane-based), TPA (nylon-based), and TPVC (vinyl chloride-based).

(Adhesive 3)

The resin contained in the adhesive 3 is not particularly limited as long as it is a resin that cures by reacting with a curing agent by the heat, and the resin may preferably be an epoxy resin, a silicone resin, or the like. The curing agent contained in the adhesive 3 is not particularly limited as long as it is a curing agent that cures by reacting with the resin by the heat, and from the viewpoint of quickly curing the epoxy resin at a low temperature, the curing agent preferably includes at least one compound selected from a group consisting of amine-based compounds, imidazole-based compounds, and thiol-based compounds. In addition, from the viewpoint of controlling the curing reaction of the adhesive 3 by the heat, it is preferable to use a capsule-type curing agent including a core containing the curing agent and a shell covering the core.

The adhesive 3 includes, for example, an adhesive composition in which 100 parts by mass of a bisphenol A type epoxy resin, 5 parts by mass of an epoxy resin imidazole adduct compound, 20 parts by mass of a capsule type curing agent, and 20 parts by mass of silica are blended.

(Heat-Inputting Step)

The heat-inputting method for the adherend member 1 in the heat-inputting step is not particularly limited as long as it is a method by which local heating can be performed, and may be a non-contact type or a contact type. The non-contact type heat-inputting method may be, for example, light-condensing heating by a laser or an electron beam, electromagnetic wave heating by a high frequency, a microwave, or the like, or other methods. In addition, a contact type heat-inputting method may be, for example, heating by a heater made of ceramic or the like.

(Configuration of Heat-Inputting Portion 4b in Adherend Member 1)

FIG. 11 is a perspective view showing an example of the heat-inputting portion 4b in the adherend member 1. As shown in FIG. 11, it is preferable to have a plurality of the heat-inputting portions 4b. Besides, when light-condensing heating by using a laser or an electron beam is adopted as the heat-inputting method, the heat-inputting portion 4b preferably has a lens shape that allows a laser or an electron beam to be condensed onto the adhesive. Thereby, the range and amount of the heat input to the adherend member 1 can be adjusted, and the adhesive can be quickly cured. Furthermore, by having a plurality of heat-inputting portions 4b, simultaneous multi-point irradiation or multi-point scanning irradiation of a laser can be performed. Therefore, uniform curing of the adhesive can be realized.

In addition, the shape of the heat-inputting portion 4b being a laser irradiation portion can be adjusted according to the shape of the heat-inputting portion 1c of the adherend member 1 or the density of the heat-inputting energy (energy of laser or electron beam) at which the surface heat absorption rate of the adherend member 1 becomes maximum.

FIG. 12 is a plan view showing the shape of the heat-inputting portion 4b when heat is input by light-condensing heating with a laser or an electron beam. As shown in FIG. 12, a shape 1210 of the heat-inputting portion 4b is, for example, circular. This shape is formed by, for example, stopping down a lens aperture (not shown). However, the heat-inputting portion 4b is not necessarily limited to a circle, and can be formed into an ellipse or a polygon including a triangle and a quadrilateral such as a shape 1220, 1230, 1240, or 1241 in a manner that the laser or the electron beam can pass through and irradiate the adherend member 2 and the thermosetting adhesive simultaneously. Moreover, an irradiation region having a desired shape can be formed by, for example, using a mask having an opening that has the same shape as that of the heat-inputting portion 4b.

Embodiment 2

Another embodiment of the present invention is described below. Note that, for convenience of explanation, the members having the same functions as the members described in the above embodiment are designated by the same reference numerals, and the description thereof is not repeated.

FIG. 13 is a perspective view showing a procedure of a production method for a bonded article according to the embodiment. The production method according to the embodiment is a method of bonding the adherend member 2 serving as a lens component to the adherend member 1. As shown in FIG. 13, in Step 1310, the thermosetting adhesive 3 is injected into three concave portions of the adherend member 1 using a dispenser 21.

Next, in Step 1320, the adherend member 2 is set to the adherend member 1. The adherend member 2 has three convex portions that can be inserted into the three concave portions of the adherend member 1 into which the adhesive 3 is injected. In Step 1320, the adherend member 2 is set to the adherend member 1 by inserting the convex portions into the three concave portions into which the adhesive 3 is injected.

Next, in Step 1330, the position of the adherend member 2 with respect to the adherend member 1 is adjusted using a position adjustment device 22.

Then, in Step 1340, the heat H is input from the side of the adherend member 1 opposite to the adhesive 3 toward the application region of the adhesive 3. Here, the concave groove 4a (the heat transfer-inhibiting structure) is formed in the adherend member 1 in a manner of surrounding the heat-inputting place of the heat H. Therefore, local heating of the heat H at the heat-inputting position can be performed, and the thermosetting adhesive 3 can be thermally cured quickly and with less energy.

The present invention is not limited to each of the above-described embodiments, various changes can be made within the scope of claims, and embodiments obtained by appropriately combining the technical means disclosed in the different embodiments are also included in the technical scope of the present invention.

As described above, the bonded article according to one aspect of the present invention s characterized in that the bonded article includes: a first member having a thermal conductivity of 1 w/m·K or more, a second member made of a material able to adhere to the first member, and an adhesion portion that is formed of a cured product of a thermosetting adhesive and that is in contact with both the first member and the second member; and the first member has a heat transfer-inhibiting structure that inhibits transfer of heat from a portion in contact with the adhesion portion to a peripheral portion.

Note that, the "portion in contact with the adhesion portion" in the first member corresponds to a heat-inputting portion for thermally curing the thermosetting adhesive in the production method for a bonded article. The bonded article according to one aspect of the present invention is an article obtained by thermally curing the adhesive in contact with the contact portion, taking the contact portion in contact with the thermosetting adhesive as the heat-inputting portion.

According to the above configuration, because the first member has a heat transfer-inhibiting structure that inhibits transfer of heat from the portion thereof in contact with the adhesion portion to the peripheral portion thereof, when the adhesive in contact with the contact portion is thermally cured taking the contact portion as the heat-inputting portion, local heating at the contact portion can be performed. Therefore, according to the above configuration, the thermosetting adhesive can be thermally cured quickly and with less energy.

In the bonded article according to one aspect of the present invention, the heat transfer-inhibiting structure may include concave grooves arranged between the portion in contact with the adhesion portion and the peripheral portion in the first member.

According to the above configuration, the portion in contact with the adhesion portion and the peripheral portion are partitioned by a space formed by concave grooves. Therefore, in the production method for a bonded article, the heat introduced into the portion in contact with the adhesion portion (the heat-inputting portion) is conducted to the space (air) configured by the concave grooves before being transmitted to the peripheral portion. Generally, the thermal conductivity in air is much lower than that inside the first member, and thus a heat flux that is conducted from the portion in contact with the adhesion portion and reaches the peripheral portion is reduced. That is, the heat conduction to the peripheral portion of the first member is inhibited. As a result, heat is less likely to be conducted from the concave groove to the peripheral portion, and is more likely to be remained in the portion on the contact portion side than the concave groove. Therefore, because the amount of the heat remained in the contact portion is increased, local heating at the contact portion can be realized.

In the bonded article according to one aspect of the present invention, the heat transfer-inhibiting structure may include non-through holes arranged between the portion in contact with the adhesion portion and the peripheral portion in the first member.

According to the above configuration, the portion in contact with the adhesion portion and the peripheral portion are partitioned by a space formed by the non-through holes. Therefore, local heating at the contact portion can be realized.

In the bonded article according to one aspect of the present invention, the heat transfer-inhibiting structure may include a thin-wall portion that is arranged closer to a side of the peripheral portion than the portion in contact with the adhesion portion in the first member and has a thickness smaller than that of the portion in contact with the adhesion portion.

According to the above configuration, a level difference is formed between the portion in contact with the adhesion portion and the thin-wall portion. Besides, the portion in contact with the adhesion portion and the peripheral portion in the first member are partitioned by the space formed by the level difference. Therefore, local heating at the contact portion can be realized.

In the bonded article according to one aspect of the present invention, the heat transfer-inhibiting structure may include a narrow width portion that is narrower than or has the same width as the portion in contact with the adhesion portion in the first member, and hollow portions penetrating the first member may be formed by the narrow width portion.

According to the above configuration, the heat transfer-inhibiting structure includes the narrow width portion, and thereby the hollow portions penetrating the first member are formed in the first member. Besides, the portion in contact with the adhesion portion and the peripheral portion in the first member are partitioned by the hollow portion. Therefore, local heating at the contact portion can be realized.

In addition, as described above, a bonded article according to one aspect of the present invention is characterized in that the bonded article includes: a first member having a thermal conductivity of 1 w/m·K or more, a second member made of a material able to adhere to the first member, and an adhesion portion that is formed of a cured product of a thermosetting adhesive and that is in contact with both the first member and the second member; and in the first member, an amount of transfer of heat of a material constituting a portion in contact with the adhesion portion is smaller than that of a material constituting a portion other than the portion in contact.

According to the above configuration, the amount of transfer of heat of the material constituting the portion of the first member that is in contact with the adhesion portion is smaller than that of the material constituting the portion other than the contact portion. Therefore, when the adhesive in contact with the contact portion is thermally cured taking the contact portion as the heat-inputting portion, the heat is remained in the contact portion and local heating at the contact portion can be performed. Therefore, according to the above configuration, the thermosetting adhesive can be thermally cured quickly and with less energy.

In the bonded article according to one aspect of the present invention, the portion in contact with the adhesion portion and the portion other than the portion in contact may be configured by separate members, and the portion in contact with the adhesion portion is preferably arranged as a nesting member inserted into the portion other than the portion in contact.

According to the above configuration, local heating at the contact portion can be performed.

In addition, as described above, the production method for a bonded article according to one aspect of the present invention is a production method for a bonded article of a first member having a thermal conductivity of 1 w/m·K or more and a second member made of a material able to adhere to the first member. The production method for a bonded article is characterized in that the production method includes: an applying step of applying a thermosetting adhesive so as to contact both the first member and the second member, and a heat-inputting step of introducing heat from a surface of the first member different from an application surface of the adhesive toward an application region of the adhesive; and the first member has a heat transfer-inhibiting structure that inhibits transfer of heat from a heat-inputting portion into which heat is introduced to a peripheral portion.

According to the above configuration, in the heat-inputting step, when the adhesive in contact with the heat-inputting portion is thermally cured, local heating at the heat-inputting portion can be performed. Therefore, according to the above configuration, the thermosetting adhesive can be thermally cured quickly and with less energy.

In addition, as described above, a production method for a bonded article according to one aspect of the present invention is a production method for a bonded article of a first member having a thermal conductivity of 1 w/m·K or more and a second member made of a material able to adhere to the first member. The production method for a bonded article is characterized in that the production method includes: an applying step of applying a thermosetting adhesive so as to contact both the first member and the second member, and a heat-inputting step of introducing heat from a surface of the first member different from an application surface of the adhesive toward an application region of the adhesive; and in the first member, an amount of transfer of heat of a material constituting a heat-inputting portion into which heat is introduced is smaller than that of a material constituting a portion other than the heat-inputting portion.

According to the above configuration, in the heat-inputting step, when the adhesive in contact with the heat-inputting portion is thermally cured, the heat is remained in the heat-inputting portion and local heating at the heat-inputting portion can be performed. Therefore, according to the above configuration, the thermosetting adhesive can be thermally cured quickly and with less energy.

What is claimed is:

1. A bonded article, comprising:
a first member having a thermal conductivity of 1 w/m·K or more, and having a concave portion;
a second member made of a material able to adhere to the first member; and
an adhesion portion that is formed of a cured product of a thermosetting adhesive and that is in contact with both the first member and the second member, and injected into the concave portion, wherein
the first member comprises a heat transfer-inhibiting structure that is separated from the concave portion, and inhibits transfer of heat from a portion in contact with the adhesion portion to a peripheral portion.

2. The bonded article according to claim 1, wherein
the heat transfer-inhibiting structure comprises concave grooves arranged between the portion in contact with the adhesion portion and the peripheral portion in the first member.

3. The bonded article according to claim 1, wherein
the heat transfer-inhibiting structure comprises non-through holes arranged between the portion in contact with the adhesion portion and the peripheral portion in the first member.

4. A bonded article, comprising:
a first member having a thermal conductivity of 1 w/m·K or more,
a second member made of a material able to adhere to the first member; and
an adhesion portion that is formed of a cured product of a thermosetting adhesive and that is in contact with both the first member and the second member,
wherein the first member comprises a heat transfer-inhibiting structure that inhibits transfer of heat from a portion in contact with the adhesion portion to a peripheral portion, and the heat transfer-inhibiting structure comprises a thin-wall portion that is arranged closer to a side of the peripheral portion than the portion in contact with the adhesion portion in the first member and has a thickness smaller than that of the portion in contact with the adhesion portion.

5. A bonded article, comprising:
a first member having a thermal conductivity of 1 w/m·K or more,
a second member made of a material able to adhere to the first member; and
an adhesion portion that is formed of a cured product of a thermosetting adhesive and that is in contact with both the first member and the second member,
wherein the first member comprises a heat transfer-inhibiting structure that inhibits transfer of heat from a portion in contact with the adhesion portion to a peripheral portion, and the heat transfer-inhibiting structure comprises a narrow width portion that is narrower than or has a same width as the portion of in contact with the adhesion portion in the first member, and hollow portions penetrating the first member are formed by the narrow width portion.

6. A bonded article, comprising:
a first member having a thermal conductivity of 1 w/m·K or more;
a second member made of a material able to adhere to the first member; and
an adhesion portion that is formed of a cured product of a thermosetting adhesive and that is in contact with both the first member and the second member, wherein
in the first member, an amount of transfer of heat of a first material constituting a portion in contact with the adhesion portion is smaller than that of a second material constituting a portion other than the portion in contact, wherein the portion in contact with the adhesion portion made of the first material has smaller thermal conductivity than the portion other than the portion in contact made of the second material.

7. The bonded article according to claim 6, wherein the portion in contact with the adhesion portion and the portion other than the portion in contact are configured by separate members, and the portion in contact with the adhesion portion is arranged as a nesting member inserted into the portion other than the portion in contact.

8. A production method for a bonded article, which is a production method for a bonded article of a first member having a thermal conductivity of 1 w/m·K or more, and having a concave portion, and a second member made of a material able to adhere to the first member, the production method comprising:

an applying step of applying a thermosetting adhesive into the concave portion of the first member so as to contact both the first member and the second member; and a heat-inputting step of introducing heat from a surface of the first member different from an application surface of the adhesive toward an application region of the adhesive, wherein the first member comprises a heat transfer-inhibiting structure that is separated from the concave portion, and inhibits transfer of heat from a heat-inputting portion into which heat is introduced to a peripheral portion.

9. A production method for a bonded article, which is a production method for a bonded article of a first member having a thermal conductivity of 1 w/m·K or more and a second member made of a material able to adhere to the first member, the production method comprising:

an applying step of applying a thermosetting adhesive so as to contact both the first member and the second member, and a heat-inputting step of introducing heat from a surface of the first member different from an application surface of the adhesive toward an application region of the adhesive, wherein in the first member, an amount of transfer of heat of a first material constituting a heat-inputting portion into which heat is introduced is smaller than that of a second material constituting a portion other than the heat-inputting portion, wherein the first material has smaller thermal conductivity than the second material.

* * * * *